United States Patent [19]

Tsai et al.

[11] Patent Number: 5,742,409
[45] Date of Patent: Apr. 21, 1998

[54] APPARATUS FOR PIXEL INSERTION IN OPTICAL SCANNERS

[75] Inventors: Cha-Lin Tsai; Aleck Hong, both of Hsinchu, Taiwan

[73] Assignee: Umax Data System Inc., Hsinchu, Taiwan

[21] Appl. No.: 544,483

[22] Filed: Oct. 18, 1995

[51] Int. Cl.⁶ .............................. H04N 1/41; H04N 1/40; H04N 1/46; H04N 7/01

[52] U.S. Cl. .................. 358/505; 358/428; 358/431; 358/445; 358/443; 358/448; 358/530; 358/525; 348/448; 348/450

[58] Field of Search ..................... 358/448, 443, 358/500, 505, 474, 515, 525, 431, 428, 447, 451, 445, 530, 506; 382/299, 300, 301, 302; 348/223, 419, 420, 458

[56] References Cited

U.S. PATENT DOCUMENTS

| | | | |
|---|---|---|---|
| 4,611,348 | 9/1986 | Williams et al. | 382/300 |
| 4,712,141 | 12/1987 | Tomohisa et al. | 358/448 |
| 4,734,759 | 3/1988 | Kobori et al. | 358/525 |
| 4,740,832 | 4/1988 | Sprague | 348/448 |
| 4,783,698 | 11/1988 | Harney | 358/428 |
| 4,796,085 | 1/1989 | Shinada | 358/515 |
| 5,646,696 | 7/1997 | Sprague | 348/448 |

*Primary Examiner*—Edward L. Coles, Sr.
*Assistant Examiner*—Mark Wallerson
*Attorney, Agent, or Firm*—Bacon & Thomas

[57] ABSTRACT

The invention relates to pixel insertion on optical scanners. The invention increases the efficiency of video buffer in optical scanners and improves the speed of I/O device by locating the position of interpolation device in front of video buffer which is for temporarily storing image data and outputting the image data. Immediately after the video buffer is an input buffer which is for receiving the output of the video buffer. The input buffer provides an interface for video buffer and the interpolation device. The function of the interpolation device is for inserting pixels into the original pixels to increase the resolution of the image. When the host machine is requesting image data, an output buffer delivers the image data in the interpolation device to an I/O device for the host machine to read.

16 Claims, 6 Drawing Sheets

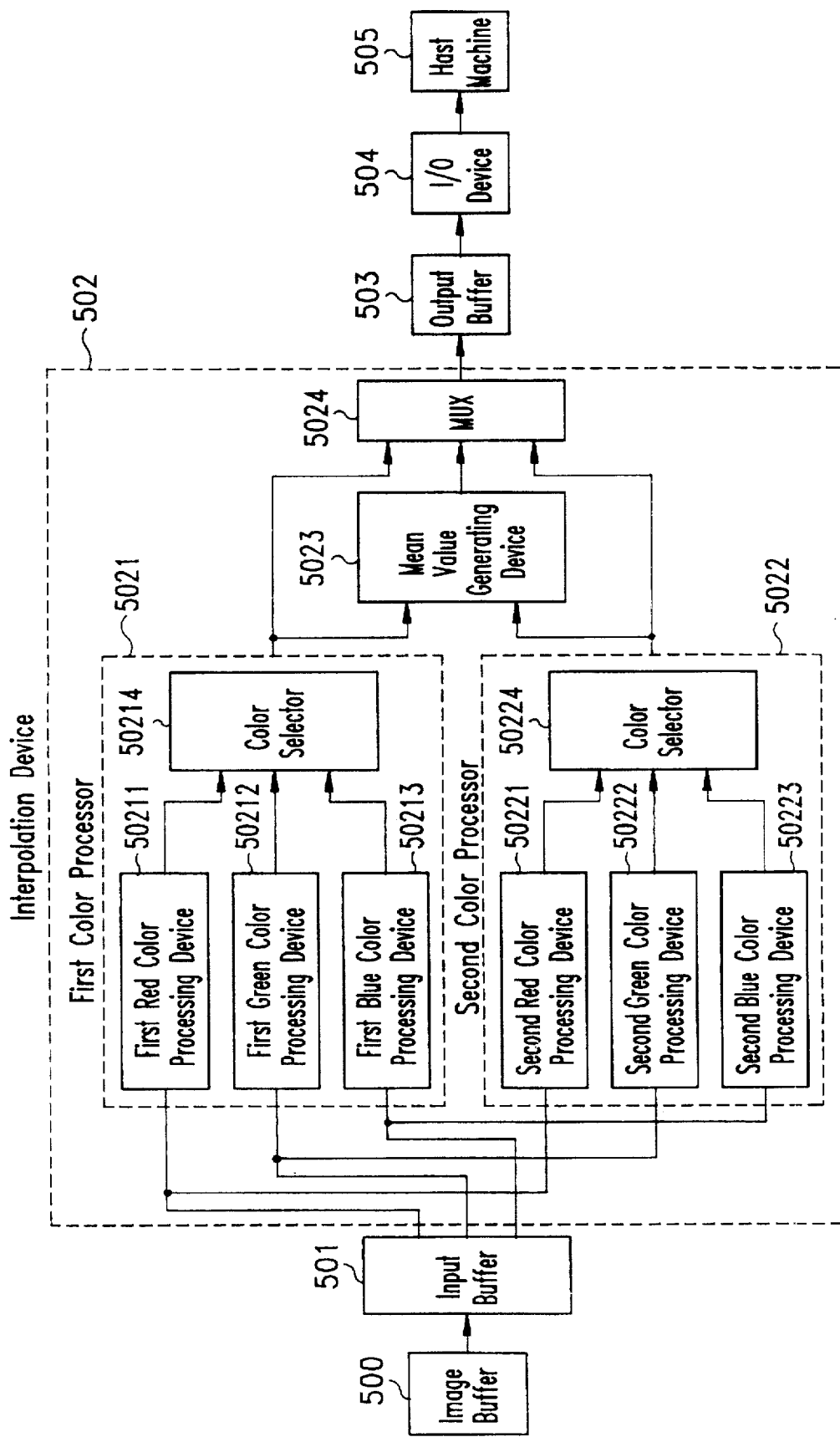

APPARATUS FOR PIXEL INSERTION IN OPTICAL SCANNERS

BACKGROUND OF THE INVENTION

A. Field of the Invention

The invention is broadly concerned with and intended particularly for pixel insertion on optical scanners.

B. Description of the Prior Art

A well-know technique to improve image resolution at a specific degree is using pixel insertion. For instance, if we want to increase the resolution of an optical scanner which is currently 600 dpi to 1200 dpi, then we may insert an additional pixel between two pixels. FIG. 1 is a schematic diagram showing the idea of pixel insertion. Referring to FIG. 1, the small squares represent original pixels of the image which have CCD (Charged Couple Device) resolution of 600 dpi. The small triangles which also have CCD resolution of 600 dpi represent the pixels inserted to the original image to enhance the resolution of the original image. Consequently, after pixel insertion, the final resolution is increased to 1200 dpi.

Conventionally, pixel insertion can be accomplished using either software or hardware. The software implementation is commonly called "interpolation". Software implementation is cheaper than hardware implementation. The implementation is also much easier. However, it is very slow.

In contrast, hardware implementation is faster than software programming. As speed is concerned, hardware implementation is preferred. Conventionally, hardware implementation involves inserting pixels before a video buffer. FIG. 2 is a schematic diagram of the structure of a scanner. As the fibre shows, after an image is scanned, CCD 201 senses the image and then sends the analog sisal to A/D converter 202 to be converted into digital data. The digital data is then forwarded to interpolation device 203 for pixel insertion. As the pixel insertion process is finished, the image data is stored in video buffer 204. Video buffer 204 can be a DRAM or a SRAM. When host machine or displaying device 207 is requesting image data transmission, the image data stored in video buffer 204 is forwarded to host machine or display device 207 through FIFO device 205 and I/O device 206. FIFO device 205 is for increasing the transmission rate of I/O device 206. I/O device 206 can be a SCSI connector, printer port, or any other devices which can be used as an I/O device.

According to the hardware implementation shown in FIG. 2, the processing carried out by A/D converter 202 is synchronized to that of video buffer 204 FIG. 3A shows the operations performed in the devices corresponding to the devices of FIG. 2. A/D converter 301 outputs pixels to first pixel processing device 302 in sequential order. First pixel processing device 302 and second pixel processing device 303 are both latch devices. The difference is that first pixel processing device 302 processes the nth pixel while second pixel processing device 303 processes the (n−1)th pixel. Mean value generating device 304 generates the mean value of the outputs of the first pixel processing device 302 and second pixel processing device 303. That is, the value of (QA+QB)/2. The function of mean value generating device 304 is for computing the interpolation value of the pixels. A MUX 305 is for selecting the output (QB)of second pixel processing device 303 or the output (QC)of mean value generating device 304. The output of MUX 305 is then sent to output device 306.

To illustrate the synchronous operations of each device, please refer to FIG. 3B. Referring to FIG. 3B, the timing diagram consists of stages. Suppose $Q_n$ is the value of the nth pixels. During the first clock cycle, the data for QA is $Q_n$. The data for QB is $Q_{n-1}$. The data for QC is $(Q_{n-1}+Q_n)/2$. And the data for QE is $(Q_{n-2}+Q_{n-1})/2$. This means that first pixel processing device 302, second pixel processing device 303, mean value generating device 304, MUX 305, and output device 306 are processed synchronously.

The advantage for the prior art is that it is easy to design. However, the problem is that video buffer is not used efficient enough. Referring to FIG. 2 again, since the process of pixel insertion is before video buffer 204, so the image data stored in video buffer 204 includes original pixels plus pixels inserted. Consequently, the size of the total pixels is doubled. For this reason, the size and bandwidth of video buffer 204 must also be doubled to store the total pixels. In addition, since the bandwidth of video buffer 204 is doubled, it has to use fast speed RAM to process the image data and a FIFO device 205 to increase the performance of I/O device 206.

SUMMARY OF THE INVENTION

Accordingly, it is an object of the invention to provide an apparatus which relocates the position of interpolation device to improve the efficiency of video buffer and then save implementation cost.

It is another object of the invention to provide an apparatus which provides the interpolation device with the function of a FIFO so as to increase the transmission rate between the I/O device and the displaying device.

Briefly described, the present invention encompasses: a video buffer for storing scanned image data; an input buffer for receiving the scanned image data from the video buffer and forwarding the scanned image data to an interpolation device; an interpolation device for inserting pixels into the the pixels of original image data; and an output buffer for outputting the pixels of the image data from the interpolation device to an I/O device.

BRIEF DESCRIPTION OF THE DRAWINGS

These and other objects and advantages of the present invention will become apparent by reference to the following description and accompanying drawings wherein:

FIG. 2 is a block diagram showing the structure of a pixel insertion apparatus in a scanner according to the prior an.

FIG. 5 is a block diagram showing the preferred embodiment of the invention.

DETAILED DESCRIPTION OF THE PREFERRED EMBODIMENTS

Figure 1:
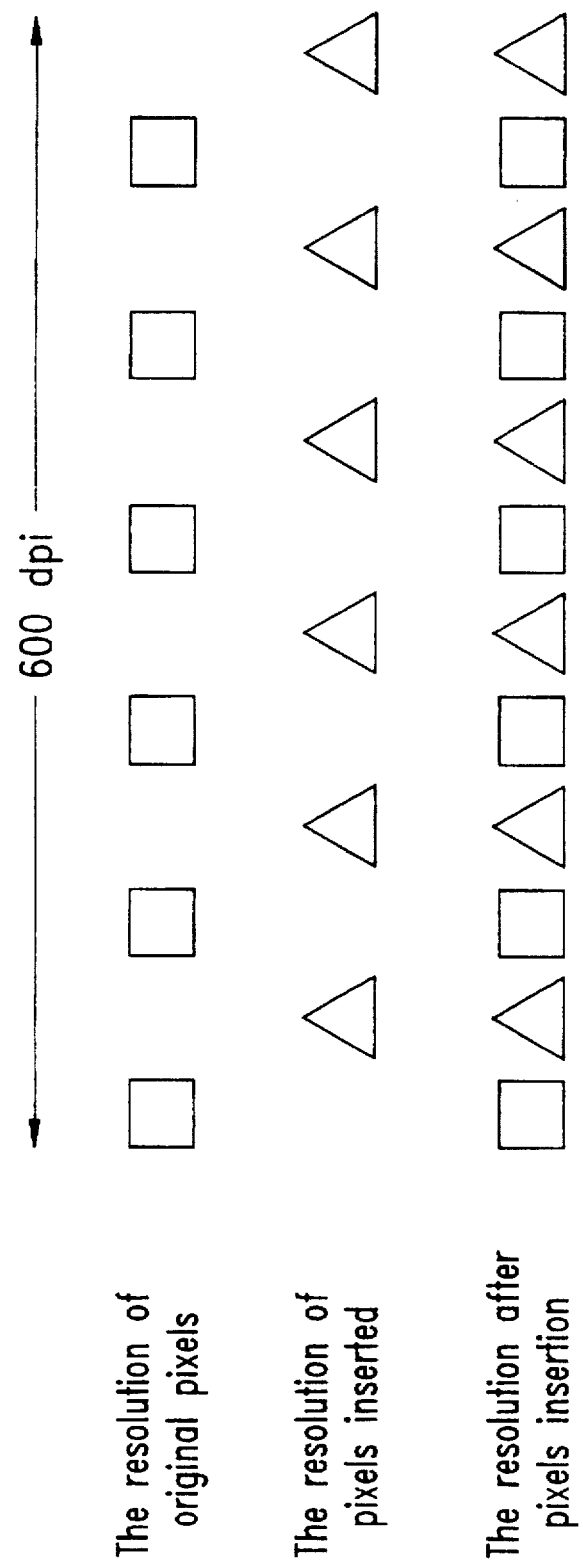
FIG. 1 is a diagram showing a pixel insertion method.
Figure 2:
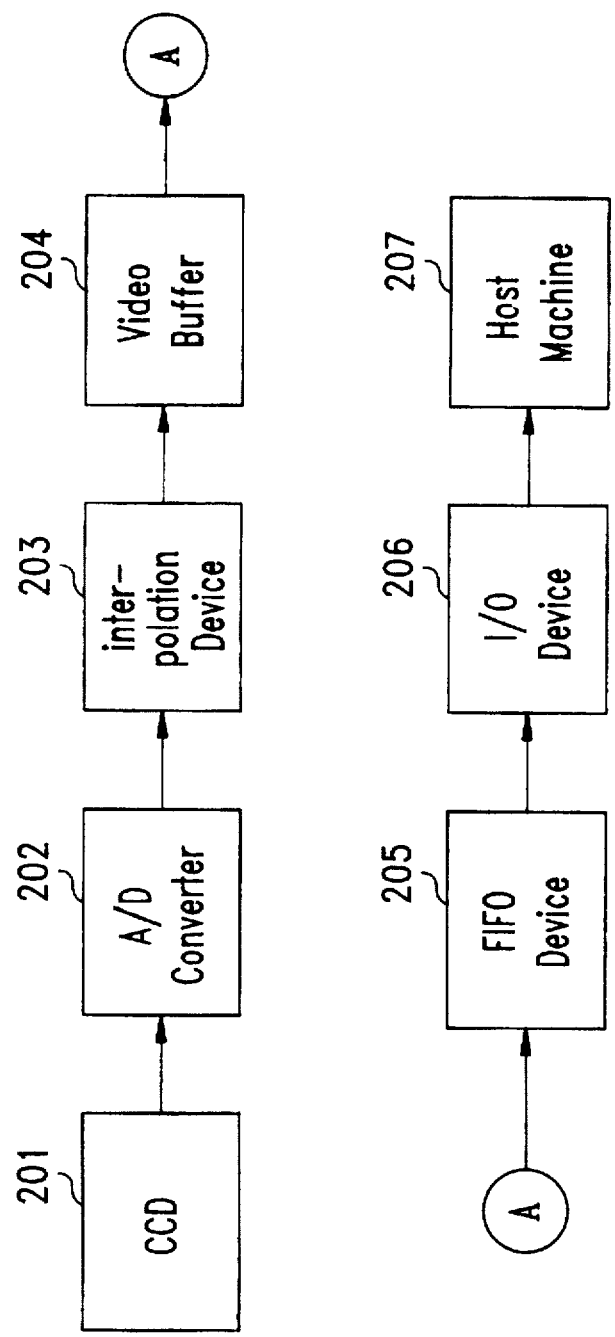
Figure 3A:
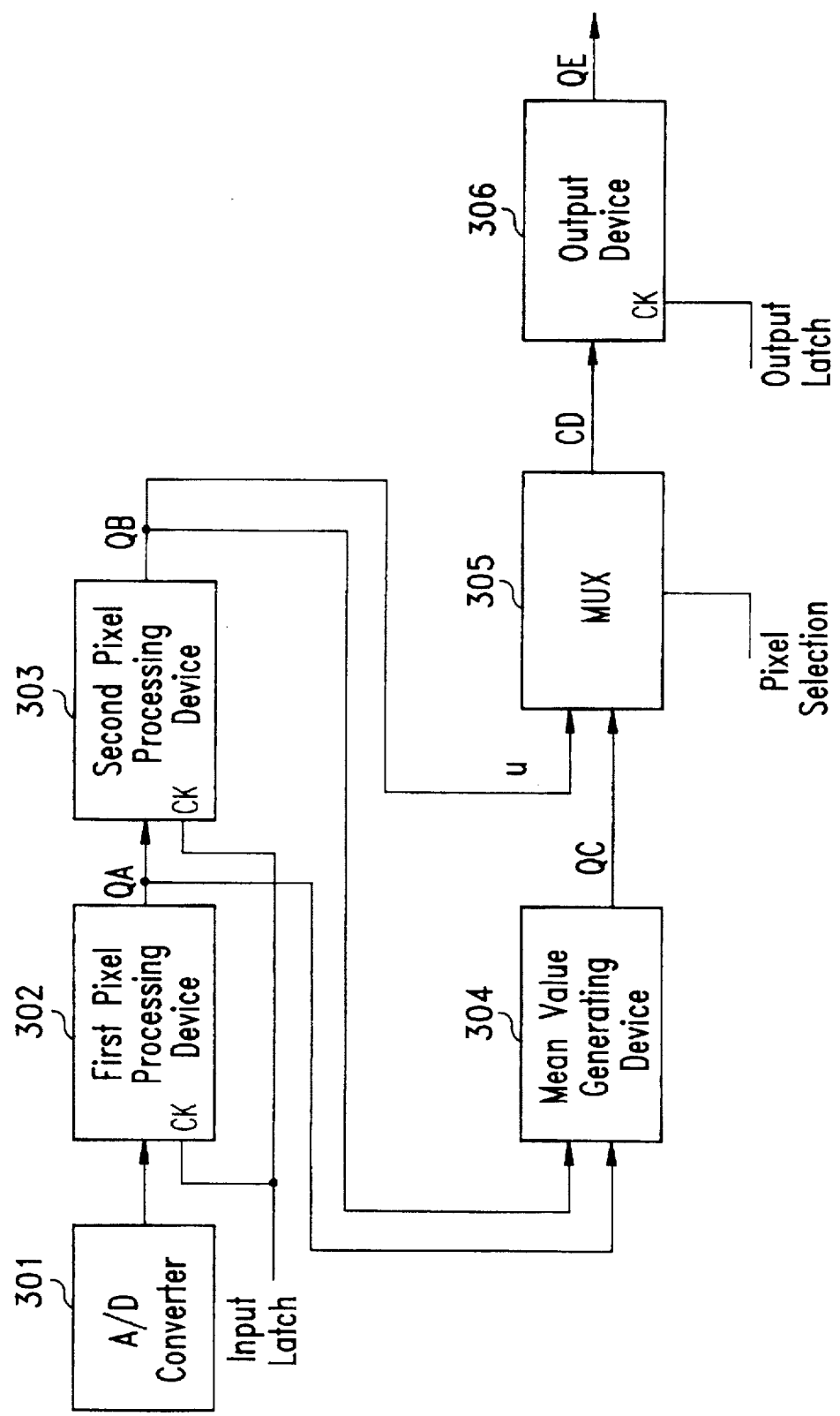
FIG. 3A is a block diagram showing the operation of inserting pixels according to the prior art.
Figure 3B:
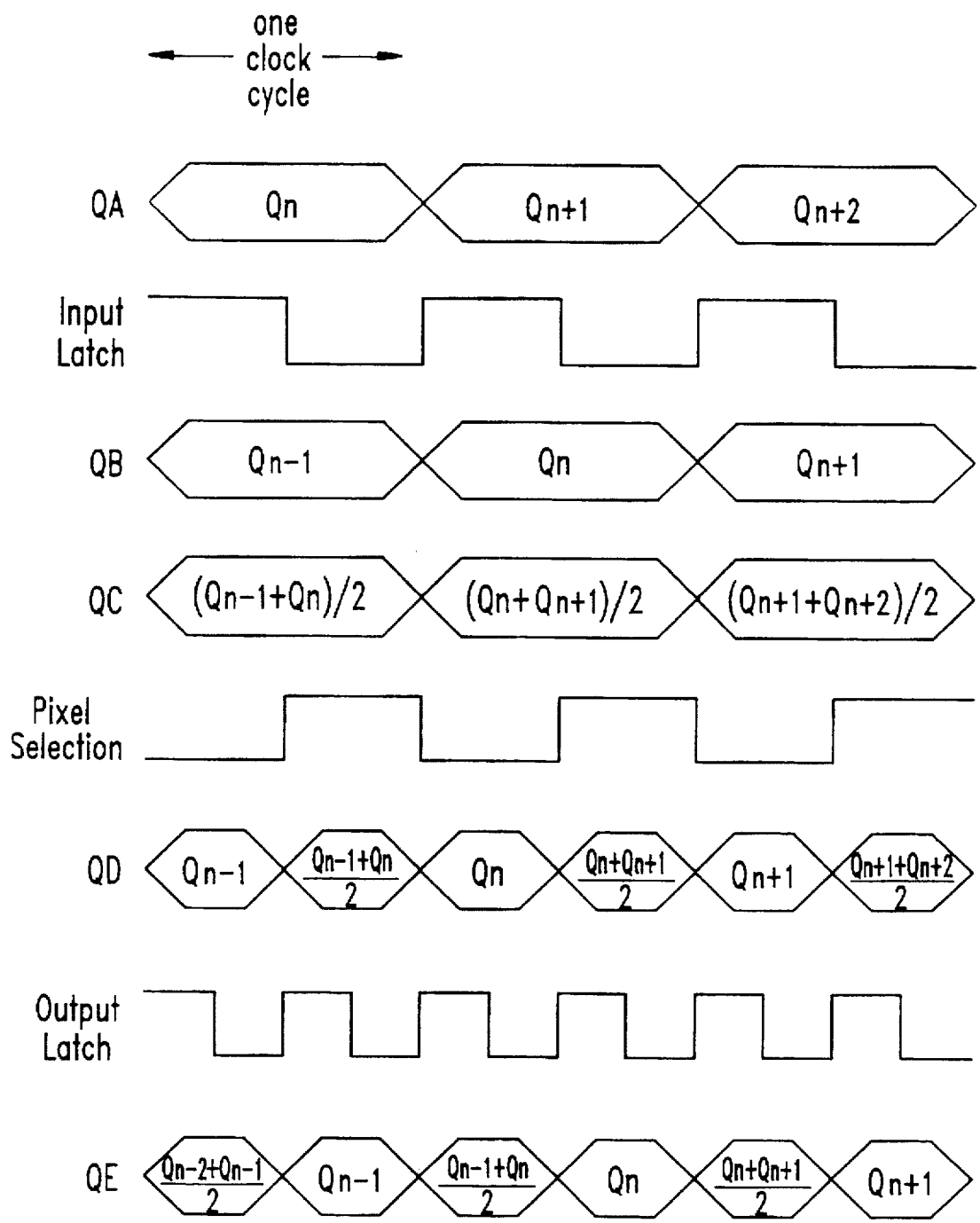
FIG. 3B is a timing diagram of FIG. 3A.
Figure 4:
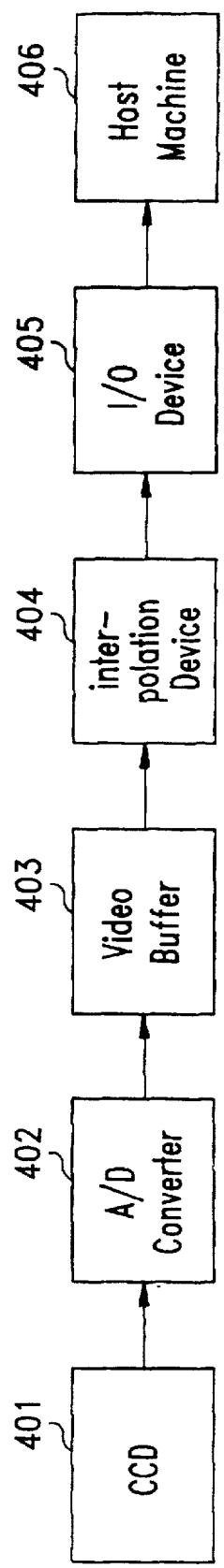
FIG. 4 is a block diagram showing the preferred embodiment of the invention.

To illustrate the advantages of the invention, please refer to FIG. 4. FIG. 4 is a block diagram showing the arrangement and order of the invention in a scanner. As the figure shows, CCD 401 is for capturing the image data which are output as analog signals. A/D converter 402 converts the analog image data input to digital signals. Video buffer 403 stores digital image data and then forwards the image data to interpolation device 404 for pixel insertion. After the interpolation process is complete. The image data is sent to I/O device 405 for transmitting the data to a host machine or displaying device 406.

The detailed description of the pixel insertion is illustrated more clearly in FIG. 5. Input buffer 501 receives the output of video buffer 500, then forwards the scanned image data to interpolation device 502 for pixel insertion. Interpolation device 502 inserts pixels into the original pixels. After the interpolation process is complete, output buffer 503 forwards the image data to I/O device 504.

The interpolation device 502 mainly contains four parts: (1) first pixel processing device 5021 which processes odd number pixels of various colors; (2) second pixel processing device 5022 which processes even number pixels of various colors; (3) mean values generating device 5023 for generating mean value of the outputs of first pixel processing device 5021 and second pixel processing device 5022; (4) MUX 5024 for selecting an output of the first pixel processing device 5021, second pixel processing device 5022 and mean value generating device 5023.

First pixel processing device 5021 contains: first red color processing device 50211 for processing red color ingredients of pixels; first green color processing device 50212 for processing green color ingredients of pixels; first blue color processing device 50213 for processing blue color ingredients of pixels; and first color selector 50214 for selecting an output of first red color processing means, first green color processing device, and blue color processing device. First color selector 50214 can be a multiplexer or equivalent device.

Second pixel processing device 5022 contains similar devices to that of first pixel processing device 5021. The difference is only that second pixel processing device 5022 processes only pixels of even number. As the figure shows, second red color processing device 50221 processes red color data for the even number pixels. Second green color processing device 50222 processes green color ingredients of pixels. Second blue color processing device 50223 processes blue color ingredients of pixels. And second color selector 50224 is for selecting an output of red color processing means, green color processing means, and blue color processing means. Second color selector 50224 can also be a multiplexer or any equivalent device.

Mean value generating device 5023 receives the output values of first pixel processing device 5021 and second pixel processing device 5022 and then generates a mean value of their output value. The function of mean value generating device 5023 is the same as that of prior art.

MUX 5024 is for selecting the output of first pixel processing device 5021, second pixel processing device 5022, or mean value generating device 5023. When MUX 5024 is enabled, the desired output will be sent to output buffer 503. When the host machine 505 is requesting image data, I/O device 504 forwards the data in output buffer 503 to host machine 505 to display the scanned image.

The main difference between the invention and the prior art is that the invention relocates the position of interpolation device 404 at the position after video buffer 403. Thus, the size of the video buffer 403 and bandwidth remains the same without having to fit the size of the enlarged image data. Beside, the invention does not need a FIFO device as in the prior art because the image data to be transmitted to the host machine or displaying device 406 is already in interpolation device 404. It does not have to wait for the video buffer 403 to get ready to transfer. In other words, the interpolation device 502 performs also as a FIFO device. Because of these alterations, the invention can improve the transmission rate between the I/O device 504 and the displaying device 505.

Since the invention has altered the location of interpolation device, the access of video buffer 500 and the transmission to host machine 505 are asynchronous. The operations of each device are stated as follows:

1: When the input buffer 501 is empty, it requests video buffer 500 to transfer image data.
2: When first or second pixel processing devices requests image data, input buffer 501 sends image data to first or second pixel processing devices.
3: MUX 5024 selects original pixels or inserted pixels of desired colors and then latches the data.
4: When the I/O device 505 requests image data, if output buffer 503 is ready, then the data is sent to the I/O device 504 and then forwarded to the host machine 505.

It should be understood that various alternatives to the structures described herein may be employed in practicing the present invention. It is intended that the following claims define the invention and that the structure within the scope of these claims and their equivalents be covered thereby.

What is claimed is:

1. An apparatus for pixel insertion which is applied in an optical scanner so as to increase the efficiency of video buffer in said optical scanner and improve the speed of an I/O device, said apparatus comprising:

a video buffer for temporarily storing image data representing pixels of an image and outputting said image data;

an input buffer for receiving the output of said video buffer;

interpolation means for inserting pixels between odd numbered pixels and even numbered pixels input from said input buffer to generate data representing inserted pixels, and by then multiplexing said image data and the inserted pixel data to obtain an output of said interpolation means, wherein said interpolation means comprises:

first pixel processing means for generating the odd numbered pixels having a plurality of colors;

second pixel processing means for generating the even numbered pixels having a plurality of colors; and mean value generating means for generating the mean value of the outputs of said first pixel processing means and said second pixel processing means; and an output buffer for outputting the output of said interpolation means to said I/O device.

2. The apparatus according to claim 1, wherein said first pixel processing means comprises:

first red color processing means for processing red color data for said odd numbered pixels;

first green color processing means for processing green color data for said odd numbered pixels;

first blue color processing means for processing blue color data for said odd numbered pixels; and first color selector for selecting an output of said first red color processing means, said first green color processing means, and said first blue color processing means.

3. The apparatus according to claim 1, wherein said second pixel processing means comprises:

second red color processing means for processing red color data for said even numbered pixels;

second green color processing means for processing green color data for said even numbered pixels;

second blue color processing means for processing blue color data for said even numbered pixels; and a second color selector for selecting an output of said second red color processing means, said second green color processing means, and said second blue color processing means.

4. The apparatus according to claim 1, wherein said interpolation means further comprises:

a multiplexer for selecting the outputs of said first pixel processing means, said second pixel processing means and said mean value generating means.

5. The apparatus as claimed in claim 1 further comprising:

a charge coupled device for storing scanned image data; and an A/D converter for converting said scanned images into digital data.

6. The apparatus as claimed in claim 1 further comprising:

a displaying means for displaying the image data output from said output buffer.

7. An apparatus for pixel insertion which is applied in an optical scanner so as to increase the efficiency of a video buffer in said optical scanner and improve the speed of an I/O device, said apparatus comprising:

a video buffer for temporarily storing scanned image data;

an input buffer for receiving said scanned image data and outputting said scanned image data; and interpolation means for inserting pixels between odd numbered pixels and even numbered pixels input from said input buffer to generate data representing inserted pixels, and by then multiplexing said image data and the inserted pixel data to obtain an output of said interpolation means, wherein said interpolation means comprises:

first pixel processing means for generating the odd numbered pixels having a plurality of colors;

second pixel processing means for generating the even numbered pixels having a plurality of colors; and mean value generating means for generating the mean value of the outputs of said first pixel processing means and said second pixel processing means, and wherein said I/O device is arranged to transmit the output of said interpolation means to displaying means.

8. The apparatus as claimed in claim 7 further comprising:

a charge coupled device for storing scanned image data;

an A/D converter for converting said scanned image data into digital data.

9. The apparatus as claimed in claim 7, wherein said I/O device comprises:

an output buffer for serving as an interface between said interpolation device and said I/O device.

10. The apparatus as claimed in claim 7 further comprising:

displaying means for displaying the output of said I/O device.

11. The apparatus according to claim 7, wherein said first pixel processing means comprises:

first red color processing means for processing red color data for said odd numbered pixels;

first green color processing means for processing green color data for said odd numbered pixels;

first blue color processing means for processing blue color data for said odd numbered pixels; and first color selector for selecting an output of said first red color processing means, said first green color processing means, and said first blue color processing means.

12. The apparatus according to claim 11, wherein said first color selector is a multiplexer.

13. The apparatus according to claim 7, wherein said second pixel processing means comprises:

second red color processing means for processing red color data for said even numbered pixels;

second green color processing means for processing green color data for said even numbered pixels;

second blue color processing means for processing blue color data for said even numbered pixels; and a second color selector for selecting an output of said second red color processing means, said second green color processing means, and said second blue color processing means.

14. The apparatus according to claim 13, wherein said second color selector is a multiplexer.

15. The apparatus according to claim 7, wherein said interpolation means further comprises:

a multiplexer for selecting the outputs of said first pixel processing means, said second pixel processing means and said mean value generating means.

16. An apparatus for pixel insertion which is applied in an optical scanner so as to increase the efficiency of a video buffer in said optical scanner and improve the speed of an I/O device, said apparatus comprising:

a video buffer for temporarily storing scanned image data;

an input buffer for receiving said scanned image data and outputting said scanned image data;

interpolation means for inserting pixels into said scanned image data, wherein said interpolation means comprises:

(a) first pixel processing means for generating odd numbered pixels each having a plurality of colors, said first pixel processing means comprising:

(i) first red color processing means for processing red color data for said odd numbered pixels;

(ii) first green color processing means for processing green color data for said odd numbered pixels;

(iii) first blue color processing means for processing blue color data for said odd numbered pixels; and (iv) first color multiplexer for selecting an output of said first red color processing means, said first green color processing means, and said first blue color processing means;

(b) second pixel processing means for generating even numbered pixels each having a plurality of colors, said second pixel processing means comprises:

(i) second red color processing means for processing red color data for said even numbered pixels;

(ii) second green color processing means for processing green color data for said even numbered pixels;

(iii) second blue color processing means for processing blue color data for said even numbered pixels; and (iv) second color multiplexer for selecting an output of said second red color processing means, said second green color processing means, and said second blue color processing means; and (c) mean value generating means for generating the mean value of the outputs of said first pixel processing means and said second pixel processing means; and an I/O device for transmitting the output of said interpolation means to displaying means.

* * * * *